United States Patent [19]

James

[11] 4,198,379

[45] Apr. 15, 1980

[54] NITROGEN OXIDE POLLUTION ABATEMENT USING CATALYTIC COMBUSTION

[76] Inventor: G. Russell James, 4 Seymour Pl. West, Armonk, N.Y. 10504

[21] Appl. No.: 637,043

[22] Filed: Dec. 2, 1975

Related U.S. Application Data

[63] Continuation of Ser. No. 432,780, Jan. 11, 1974, abandoned, which is a continuation-in-part of Ser. No. 170,911, Aug. 11, 1971, abandoned.

[51] Int. Cl.² ............................................. C01B 53/04
[52] U.S. Cl. .................................. 423/239; 423/651; 423/653
[58] Field of Search ............... 423/239, 235, 245, 246, 423/247, 248, 359, 651, 52, 657, 653, 654

[56] References Cited

U.S. PATENT DOCUMENTS

| | | | |
|---|---|---|---|
| 2,910,343 | 10/1959 | Childers et al. | 423/351 |
| 3,118,727 | 1/1964 | Cohn | 423/359 |
| 3,425,803 | 2/1969 | Romeo | 423/239 |
| 3,467,492 | 9/1969 | Newman | 423/239 |
| 3,615,231 | 10/1971 | Cullom | 423/242 |
| 3,754,078 | 8/1973 | Hinrichs et al. | 423/359 |
| 3,806,582 | 4/1974 | Acres et al. | 423/239 |
| 3,817,716 | 6/1974 | Betz | 423/245 |
| 3,897,539 | 7/1975 | Fleming | 423/239 |

Primary Examiner—G. O. Peters
Attorney, Agent, or Firm—Kirschstein, Kirschstein, Ottinger & Cobrin

[57] ABSTRACT

In a process for purifying nitric acid plant tail gases in which there is catalytic combustion of a hydrogen containing gas with the oxygen contained in the tail gases, the improvement in which heat produced from the catalytic combustion is used for catalytic reforming of a stream of hydrocarbon and steam to produce the hydrogen containing gas.

2 Claims, 3 Drawing Figures

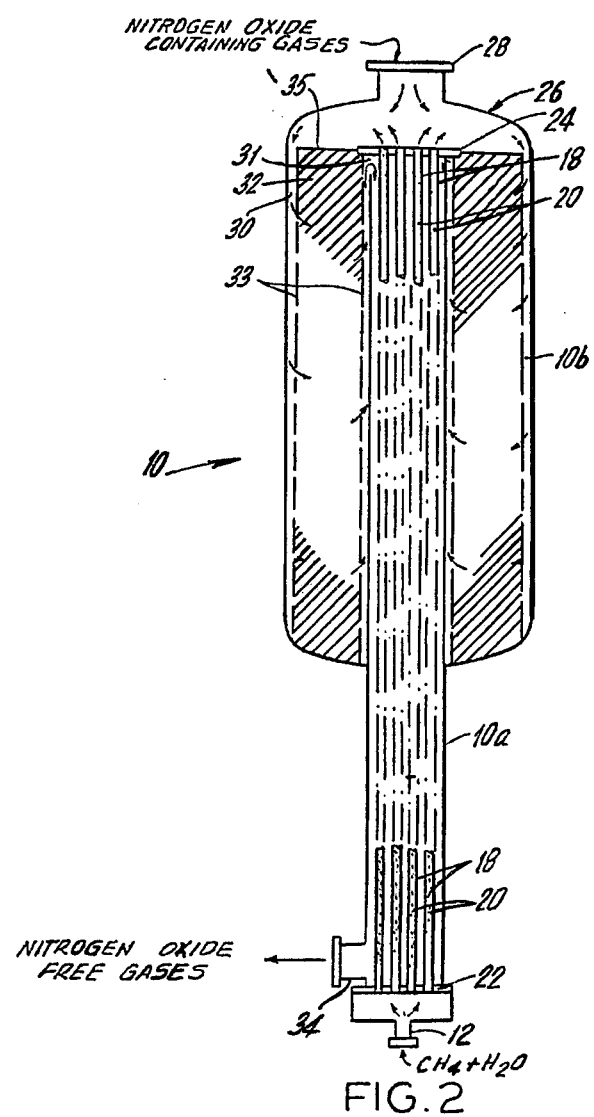

NITROGEN OXIDE POLLUTION ABATEMENT USING CATALYTIC COMBUSTION

This is a continuation of application Ser. No. 432,780 filed Jan. 11, 1974, now abandoned, which application is a continuation-in-part of applicant's prior application Ser. No. 170,911 filed Aug. 11, 1971 now abandoned entitled "Catalytic Combustion and Nitric Oxide Removal Apparatus".

BACKGROUND OF THE INVENTION

Catalysts are available for promoting catalytic combustion, i.e., reactions between hydrocarbons or hydrogen and oxygen and between nitrogen oxides and hydrocarbons or hydrogen. These catalysts are useful in eliminating nitrogen oxides from gases which also contain some oxygen. In general, reaction of oxygen with combustible hydrocarbons or hydrogen provides sufficient heat to raise the temperature of the gas mixture so that nitrogen oxides present will decompose when the oxygen present is depleted by combustion. Reactions which occur, among others, in the catalyst are:

$$CH_4 + 2O_2 \rightarrow CO_2 + 2H_2O \tag{1}$$

$$CH_4 + 4NO \rightarrow 2N_2 + CO_2 + 2H_2O \tag{2}$$

$$CH_4 + 2NO_2 \rightarrow N_2 + CO_2 + 2H_2O \tag{3}$$

$$H_2 + O_2 \rightarrow 2H_2O \tag{4}$$

$$2H_2 + 2NO \rightarrow N_2 + 2H_2O \tag{5}$$

$$4H_2 + 2NO_2 \rightarrow N_2 + 4H_2O \tag{6}$$

The reactions (1) through (6) above are all exothermic and provide considerable heat. Reactions between oxygen and hydrocarbon gases or between oxygen and hydrogen initiate at different temperatures. Generally, hydrogen will react at about 450° F. and methane at approximately 850° F. while propane will react at some intermediate temperature.

Many chemical plant heat balances such as that for nitric acid plants require that temperatures out of the abatement catalyst be high and nitrogen oxides low. Plant efficiencies are markedly reduced and pollution limits for nitrogen oxides exceeded when catalysts do not function. In this case not only is expensive hydrocarbon wasted but power is lost either because of decreased steam generation or because of lower temperature gas to power recovery turbines.

In nitric acid plants, the tail gases usually contain an objectionable amount of nitrogen oxides which constitute an atmospheric pollutant. It is well known in the art of nitric acid production to purify the tail gases by employing a process in which natural gas is used in catalytic combustion of the tail gases but since the operating temperature of noble metal catalysts should be below 1600° F., it is the practice in such a process to employ two catalytic reactors in series with an intermediate waste heat boiler to lower the process temperature. In that process the purified tail gases are frequently cooled by still another waste heat boiler before the energy in the tail gases is recovered in a turbine.

The above described process employing natural gas, hereinafter referred to as prior art process A, may be summarized as entailing, in general, the heating of the cold tail gas per se, which is derived from an absorption tower in which nitric acid is produced, followed by the mixing of natural gas principally containing methane with the hot tail gas. The resulting gas mixture, now at a temperature of about 900° F., which is a temperature above the initiation temperature for the catalytic reactions (1), (2) and (3), shown supra, is passed in contact with a noble metal catalyst which promotes these exothermic reactions. The resulting process gas stream, now at a more highly elevated temperature which is below 1600° F., is cooled in a waste heat boiler and then passed again through a second catalytic reactor to complete the reactions (1), (2) and (3). The resulting very hot purified tail gas is cooled in a second waste heat boiler prior to passage to a turbine for the recovery of energy, prior to discharge to atmosphere. Process A has several disadvantages, the most important being (1) high initial tail gas temperature requirement to promote catalytic combustion (about 900° F.), and (2) high cost of equipment. In a typical application of the prior art process A, the material balance is:

TABLE 1

|  | Tail Gas | Natural Gas | Combusted Gas |
| --- | --- | --- | --- |
| Mol % $N_2$ | 95.5 |  | 94.09 |
| $O_2$ | 2.6 |  |  |
| A | 1.0 |  | 0.98 |
| $NO_x$ | 0.3 |  |  |
| $H_2O$ | 0.6 |  | 3.44 |
| $CH_4$ |  | 100.0 | 0.07 |
| $CO_2$ |  |  | 1.42 |
| Total | 100.0 | 100.0 | 100.0 |
| Lbs./Hr. | 118,800 | 1026 | 119826 |
| Mols/Hr. | 4220 | 64.1 | 4390.8 |

It is also well known in the art of nitric acid production to purify the tail gases by employing a process in which purge gas is used in catalytic combustion of the tail gases thus permitting a relatively low operating temperature for the catalyst (about 1300° F.) but those purified gases still have to be cooled before the energy is recovered in a turbine.

The above described process employing purge gas, hereinafter referred to as prior art process B, may be summarized as entailing procedural steps comparable to process A described supra, except that a hydrogen-containing gas is mixed with the tail gas and catalytic reactions (4), (5) and (6) are carried out instead of reactions (1), (2) and (3). The initiation temperature for catalysis in process B is generally about 630° F., which is lower than for process A, and a lower temperature of about 1300° F. is attained by the catalysis. A typical hydrogen-containing gas employed in process B is the purge gas from an associated ammonia synthesis process. This purge gas contains hydrogen and nitrogen in an approximately 3:1 molar ratio together with inerts such as argon and methane, as shown in the following material balance. Process B has several disadvantages, the most important being (1) high initial tail gas temperature requirement to promote catalytic combustion (about 630° F.), (2) high cost of equipment, and (3) frequent scarcity of suitable purge gas in most nitric acid plants. In a typical application of the prior art process B the material balance is:

TABLE 2

|  | Tail Gas | Purge Gas | Combusted Gas |
| --- | --- | --- | --- |
| Mol % $N_2$ | 95.5 | 21.3 | 93.20 |
| $O_2$ | 2.6 |  |  |
| A | 1.0 | 4.0 | 1.17 |
| $NO_x$ | 0.3 |  |  |

TABLE 2-continued

| | Tail Gas | Purge Gas | Combusted Gas |
|---|---|---|---|
| $H_2O$ | 0.6 | | 4.96 |
| $CH_4$ | | 12.9 | .07 |
| $CO_2$ | | 0.1 | .60 |
| $H_2$ | | 61.7 | |
| Total | 100.0 | 100.0 | 100.0 |
| Lbs./Hr. | 118,800 | 2468 | 121268 |
| Mols/Hr. | 4220 | 226.67 | 4383.02 |

SUMMARY OF THE INVENTION

In accordance with this invention, it has been found that there is sufficient heat in gases leaving the catalytic combustion catalyst to reform a mixture of natural gas or other hydrocarbon and steam. Use of this heat via indirect heat exchange for reforming converts the incoming natural gas or hydrocarbon into a stream of gas containing a high percentage of hydrogen. This hydrogen is more than sufficient to initiate the catalytic combustion and to raise temperatures in the catalyst to a point where the remaining combustibles in the gas stream will also react with oxygen, reducing the oxygen content and further raising the temperature so that nitrogen oxide will decompose.

A feature of this invention is that since heat produced by catalytic combustion of the tail gases is used for reforming the stream of hydrocarbon and steam, the purified tail gases can be used directly in a power recovery turbine without additional cooling steps.

BRIEF DESCRIPTION OF THE DRAWINGS

As shown in the drawings wherein the same reference numbers are used for the same components in the various figures:

FIG. 2 is a cross section of a catalytic chamber according to the invention.

DESCRIPTION OF THE PREFERRED EMBODIMENT

Figure 1:
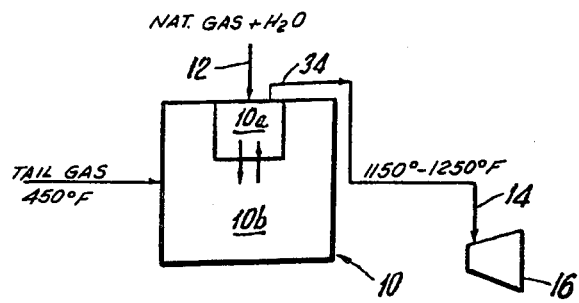
FIG. 1 is a block diagram illustrating a nitrogen oxide abatement process according to the invention.

In accordance with the present invention, as illustrated in FIG. 1, a catalyst chamber 10 is employed in which a mixture of natural gas and steam is introduced at 12 into a first sub-chamber 10a containing a catalyst which causes the natural gas to be broken down sufficiently to release a quantity of hydrogen which is then provided to sub-chamber 10b where a hydrogen-initiated reaction takes place with the tail gas in the presence of another catalyst. This last mentioned reaction corresponds with the reaction with hydrogen and oxygen first described herein above. Thus, the tail gas entering the chamber 10b need only be heated to about 450° F., and the gases emitted from the apparatus are only about 1200° F. so that they can be used immediately by a recovery turbine 16 without the need for a recovery boiler. The two sub-chambers 10a and 10b are in thermal association with one another and are described more fully in connection with FIG. 2. The operation of the sub-chamber 10b at the lower temperature serves to prolong the life of the catalyst.

FIG. 2 illustrates in detail the catalytic combustion vessel 10 which forms a part of the present invention. The sub-chamber 10a is a conduit or pipe which includes a series of tubes 18 connecting with the bottom header 22 which receives the natural gas and steam mixture. These tubes are filled with a nickel-based catalyst 20 which is capable of breaking down the natural gas and steam to produce sufficient hydrogen by the time the gases are emitted at the top of the tubes at 24 to initiate the reaction in the next sub-chamber 10b. The gases emitted from the sub-chamber 10a at 24 are mixed in the upper portion 26 of the vessel with tail gases containing nitrogen oxides admitted to the vessel at 28. This mixture is conveyed in the space 30 between the inner surface of the outer walls of the vessel 10 and a screen 33 surrounding a fume abatement catalyst 32 disposed within sub-chamber 10b and then radially inwardly through the fume abatement catalyst and the screen 33 to the outer surface of the sub-chamber 10a, and then vertically upwardly to the top of the sub-chamber 10a where these gases enter that chamber through an opening at 31 and then continue downwardly around the tubes 18 until the nitrogen oxide-free gases are emitted at 34. A baffle 35 at the top of the catalyst 32 maintains the gas flow from 26 to 30. A heat exchange takes place in the sub-chamber 10a as the gases are conveyed downwardly around the tubes 18 so that the incoming natural gas and steam mixture at 12 is heated to promote the hydrogen-producing reaction. The heat is generated in the fume abatement catalyst 32 as the gases travel radially inwardly through that catalyst. It is one of the important features of this structure that, with the radial inward travel of the gases, the outer walls of the vessel 10 are not subjected to the heat generated by the reaction in the fume abatement catalyst, thus adding to the life of the walls of the vessel.

Figure 3:
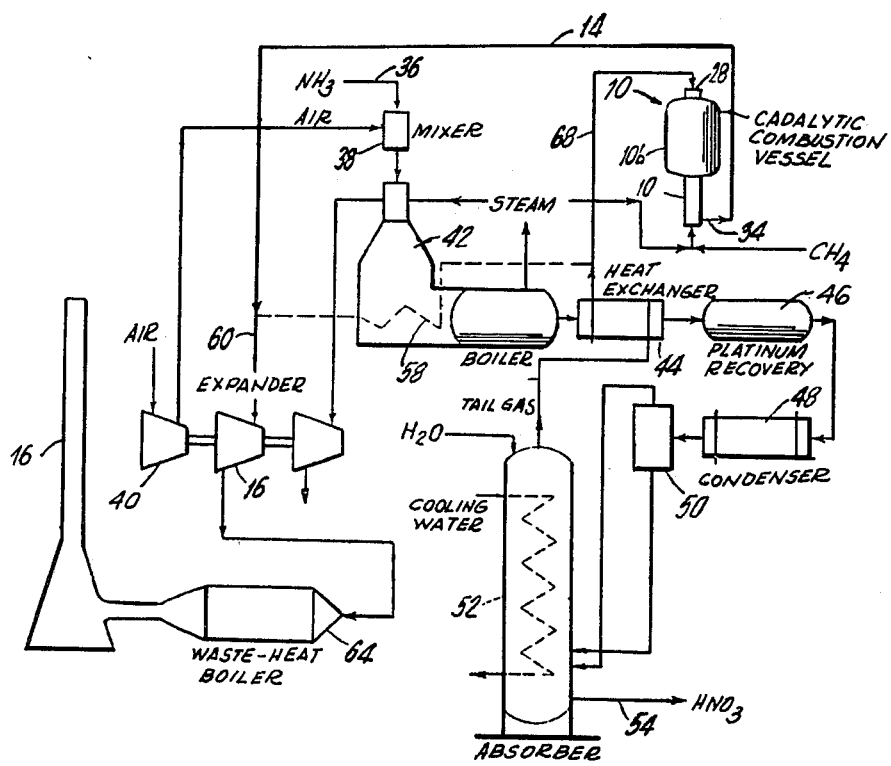
FIG. 3 is a flow diagram of a nitric acid process utilizing the catalytic chamber of FIG. 2.

FIG. 3 illustrates the entire organization of a nitric acid plant incorporating the nitrogen oxide purging apparatus of the present invention. Ammonia is supplied to the system at 36, where in a mixer 38 it is mixed with air which has been compressed by a compressor 40, and the mixture is supplied to a reactor-boiler 42. The flow of products then proceeds through a heat exchanger 44, a device 50, and an absorber 52. The primary product, nitric acid, is taken from the absorber at 54.

The tail gases are taken from the absorber at 56 and reheated in the heat exchanger 44. In the conventional system, the reheated tail gases are passed through coil 58 shown dotted in the ammonia reactor 42 and then passed on at 60 through the energy recovery turbine 16, a waste heat boiler 64, and on to discharge stack 66. In accordance with the present invention, the dotted fluid circuit, including the coils 58 in the ammonia reactor, is omitted from the system. Instead, the reheated tail gases are taken at 68 to the catalytic combustion vessel 10 and in particular, sub-chamber 10b through 28 as previously described in detail in connection with FIG. 2. The treated gases are taken from the vessel at 34 and transmitted to the energy recovery turbine 16.

In a typical application of the above described abatement process employing natural gas and steam, the material balance is:

TABLE 3

| | Tail Gas | Nat. Gas-Steam Mix | Combusted Gas |
|---|---|---|---|
| Mol % $N_2$ | 95.5 | | 90.05 |
| $O_2$ | 2.6 | | |
| A | 1.0 | | 0.94 |
| $NO_x$ | 0.3 | | |
| $H_2O$ | 0.6 | 75.0 | 7.58 |
| $CH_4$ | | 25.0 | .07 |
| $CO_2$ | | | 1.36 |

TABLE 3-continued

|  | Tail Gas | Nat. Gas-Steam Mix | Combusted Gas |
|---|---|---|---|
| Total | 100.0 | 100.0 | 100.0 |
| Lbs./Hr. | 118,800 | 4490 | 123,290 |
| Mols/Hr. | 4,220 | 256.4 | 4,483.1 |

Within the context of the present invention, the term "heat content" will be understood to encompass and include not only sensible heat, but also to include internal energy, i.e., the term "heat content" equals overall total energy content and not merely sensible heat. Thus the term "heat content", as is to be found in the U.S. Bureau of Mines "Thermodynamic Tables" includes potential for chemical reaction i.e., heat liberation potential upon reaction, as well as sensible heat.

Combustion product gases leave the combustor at approximately 1280° F. with the feed temperatures of tail gas and $H_2O$-$CH_4$ mixture of 600° F. and 500° F., respectively. Heat balance calculations are based on 100 lb. mols of nitric acid tail gas:

| Heat content of tail gas | 688,361 BTU |
|---|---|
| Heat content of $H_2O$—$CH_4$ mixture | −494,723 |
| Total Heat Input | 193,638 BTU |
| Heat content of combustion Product Gas | 193,638 BTU |

It can be seen from Tables 1, 2, and 3 above that more combusted gas at 1200° F. is produced and available to a power recovery turbine in the process according to this invention (123,290 Lbs./Hr.) than in the case of prior art process A (119,826 Lbs./Hr.) or in the case of prior art process B (121,268 Lbs./Hr.).

What is claimed is:

1. In a nitric acid process in which a waste tail gas stream containing residual nitrogen oxides and oxygen is produced, and in which said waste tail gas stream is catalytically reacted with a gas stream containing a high percentage of hydrogen at elevated temperature whereby said nitrogen oxides and oxygen react with the hydrogen component in said hydrogen-containing gas stream in an exothermic catalytic reaction to produce a treated waste tail gas stream having a diminished content of nitrogen oxides, the improved process for producing said hydrogen-containing gas stream wherein the improvement comprises:

(a) providing a stream of natural gas and a stream of steam, (b) mixing said natural gas stream with said steam stream to produce a feed steam, (c) passing said feed stream in parallel through a plurality of externally heated tubes, said tubes containing a nickel-based catalyst, whereby heat is supplied to said feed stream and to said catalyst, so as to react said natural gas and said steam endothermically at elevated temperature to produce a hot gas stream containing a high percentage of hydrogen, (d) mixing the hot hydrogen-containing gas stream produced according to step (c) with colder waste tail gas from a nitric acid process, whereby said colder waste tail gas is heated to, and a gas mixture is produced at, a temperature above 450° F. and above the initiation temperature for the exothermic catalytic reaction of step (e), (e) passing the gas mixture produced according to step (d) radially inwards through an annular bed of catalyst for said exothermic catalytic reaction disposed within said vessel external to said tubes, whereby both gas stream pressure drop and temperature of the wall of said vessel are minimized, and whereby the exothermic catalytic reaction takes place and a hot treated waste tail gas stream is produced, and (f) cooling the hot treated waste tail gas stream of step (e) by passing the hot treated waste tail gas stream external to said tubes and in indirect heat exchange with said feed stream and nickel-based catalyst of step (c), whereby a cooled treated waste tail gas stream is produced.

2. In a nitric acid process in which a waste tail gas stream containing residual nitrogen oxides and oxygen is produced at elevated pressure, in which said tail gas stream is catalytically reacted with a gas stream containing a high percentage of hydrogen at elevated temperature whereby said nitrogen oxides and oxygen react with the hydrogen component in said hydrogen-containing gas stream in an exothermic catalytic reaction to produce a treated waste tail gas stream having a diminished content of nitrogen oxides, and in which said treated waste tail gas stream is expanded through an energy recovery turbine, the improved process for producing said hydrogen-containing gas stream wherein the improvement comprises:

(a) providing a stream of natural gas and stream of steam, (b) mixing said natural gas stream with said steam stream to produce a feed stream, (c) passing said feed stream in parallel through a plurality of externally heated tubes, said tubes containing a nickel-based catalyst, whereby heat is supplied to said feed stream and to said catalyst, so as to react said natural gas and said steam endothermically at elevated temperature to produce a hot gas stream containing a high percentage of hydrogen, (d) mixing the hot hydrogen-containing gas stream produced according to step (c) with colder waste tail gas from a nitric acid process, whereby said colder waste tail gas is heated to, and a gas mixture is produced at, a temperature above 450° F. and above the initiation temperature for the exothermic catalytic reaction of step (e), (e) passing the gas mixture produced according to step (d) radially inwards through an annular bed of catalyst for said exothermic catalytic reaction disposed within said vessel external to said tubes, whereby both gas stream pressure drop and the temperature of the wall of said vessel are minimized, and whereby the exothermic catalytic reaction takes place and a hot treated waste tail gas stream is produced, (f) cooling the hot treated waste tail gas stream of step (e) by passing the hot treated waste tail gas stream external to said tubes and in indirect heat exchange with said feed stream and nickel-based catalyst of step (c), whereby a cooled treated waste tail gas stream is produced at a temperature suitable for direct passage to an energy recovery turbine, and (g) expanding said cooled treated waste tail gas stream through an energy recovery turbine, whereby useful power is produced.

* * * * *